Patented Mar. 12, 1940

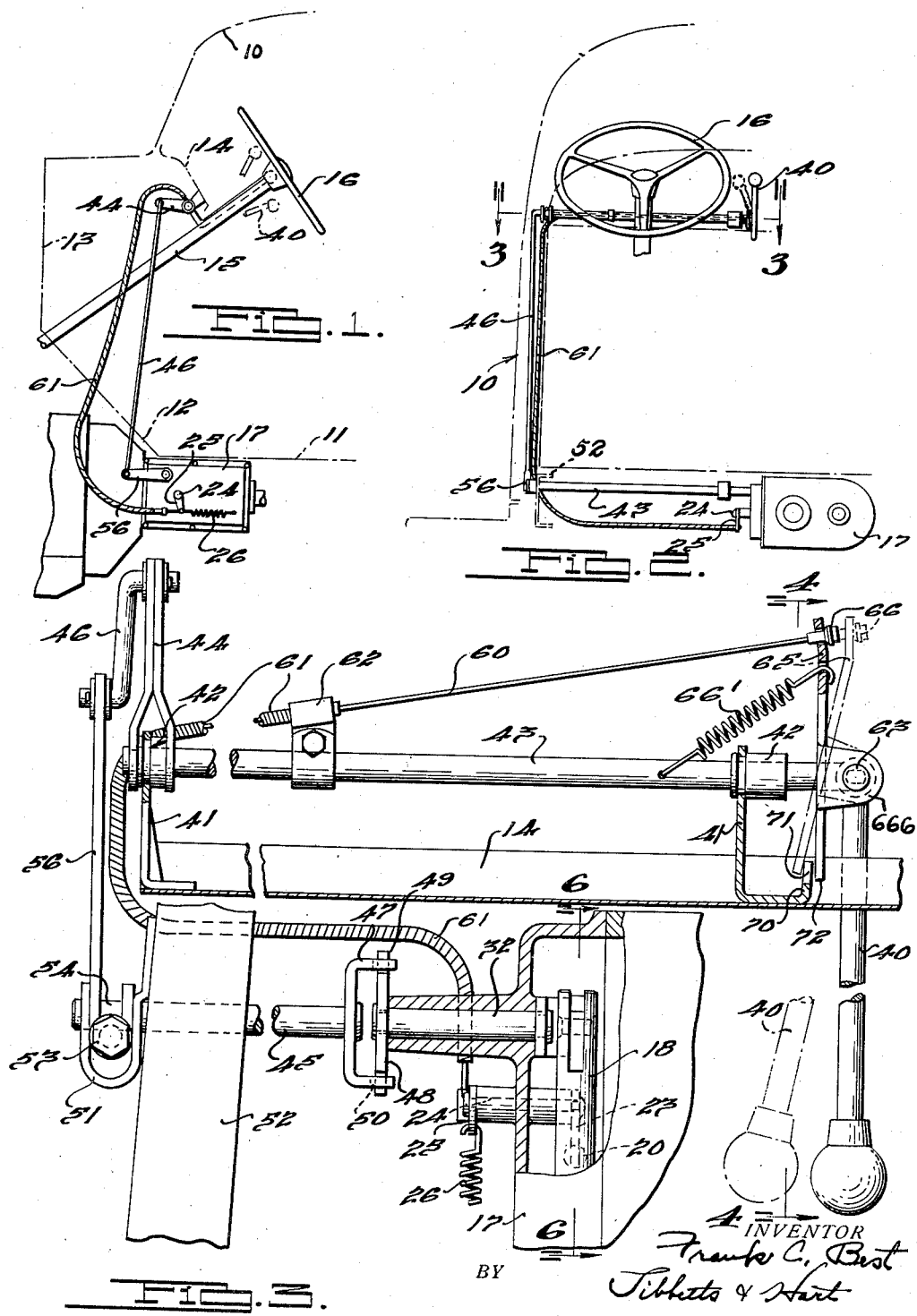

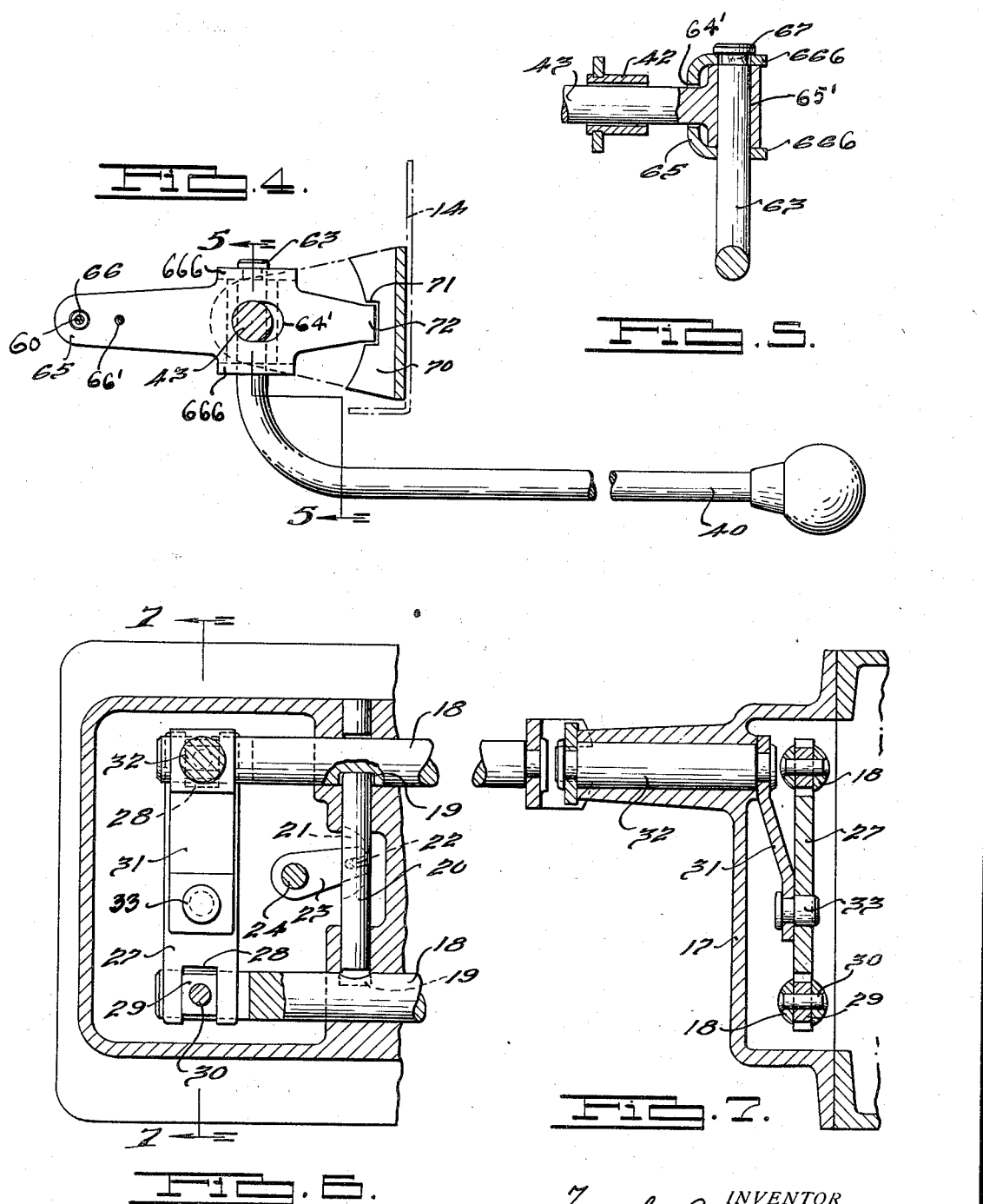

2,193,218

UNITED STATES PATENT OFFICE 2,193,218

TRANSMISSION CONTROL MECHANISM

Frank C. Best, Detroit, Mich., assignor to Packard Motor Car Company, Detroit, Mich., a corporation of Michigan Application June 24, 1938, Serial No. 215,571

12 Claims. (Cl. 74—473)

This invention relates to motor vehicles and more particularly to change speed gear mechanism wherein control means can be actuated to establish any one of a plurality of different driving relations.

One of the objects of the invention is to provide actuating means for gear changing mechanism that is substantially entirely out of the passenger space at the front of the motor vehicle body.

Another object of the invention is to provide gear shifting mechanism in which a remote handle can be manipulated to perform all of the shifting operations.

A further object of the invention is to provide shift mechanism in which one of the shift rails serves as a part of the shifting mechanism for another shift rail.

Still another object of the invention resides in the arrangement and connection of two mechanisms with a hand lever whereby the lever can be manipulated without danger of actuating an unintended part of the mechanism.

Other objects of the invention will appear from the following description taken in connection with the drawings, which form a part of this specification, and in which:

Fig. 1 is a side elevational view of the device shown diagrammatically in its assembled relation with the motor vehicle;

Fig. 2 is a similar type of view as viewed looking forwardly in the motor vehicle;

Fig. 3 is a sectional view of the device taken on line 3—3 of Fig. 2, the gear casing being partly broken away to show a shifter rail;

Fig. 4 is a sectional view taken on line 4—4 of Fig. 3;

Fig. 5 is a sectional view taken on line 5—5 of Fig. 4;

Fig. 6 is a sectional view taken on line 6—6 of Fig. 3;

Fig. 7 is a sectional view taken on line 7—7 of Fig. 6.

A motor vehicle body is indicated in dotted lines at 10 and has the usual floor 11, toe board 12, dash 13, and instrument board 14. A steering column 15 extends into the forward portion of the body and has fixed to the end thereof steering wheel 16. A power unit is located partly in advance of and partly below the toe board and floor board, the change speed gear mechanism casing of the unit being indicated at 17 and having therein a pair of axially movable shift rails 18 arranged in parallel spaced relation one above the other. Such rails are connected to clutches or gears for selectively changing the speed ratio of the drive between the engine shaft and the propeller shaft in a well known manner. The rails are formed with recesses 19 and a latch pin 20 is slidably carried by the casing for selective engagement with either recess. The latch is slotted as indicated at 21 and a pin 22 extends across the slot and is engaged by the bifurcated end of an arm 23 that is fixed to a shaft 24 extending through a wall of the gear casing. On the outer end of this shaft 24 is fixed an arm 25, and a coil spring 26 engages the arm 25 and the gear case to normally hold the latch mechanism so that the latch member 20 engages the uppermost of the rails under which condition the two high forward driving speeds can be obtained.

Between the forward ends of the rails extends a shifter element 27 having its end portions pivotally connected with the rails so that when rocked it swivels on the latched rail and shifts the unlatched rail in an axial direction. The shifter element is preferably formed of a flat piece of metal having its ends slotted as indicated at 28, and in such slotted portions of the member blocks 29 are slidably arranged. These blocks are pivotally mounted upon bosses 30 fixed to the rails. When the shifter element 27 is rocked it will swivel with block 29 on the boss 30 of the latched rail and the member will have some sliding movement relative to the block. A similar action takes place at the other end of the shifter element. In order to rock the shifter element about its journal on either one of the rails there is an actuator arm 31 fixed to the inner end of a stub shaft 32 extending into the gear case 17. This actuator arm is pivotally connected to the shifter member by a pin 33 at a point intermediate the rails. The rotation of the stub shaft 32 will rotate the arm 31 therewith and the arm in turn will swing the shifter member about its journal on the latched rail thereby transmitting axial movement to the other rail.

With such selector and shifter mechanisms is associated actuator means for each that extends from beneath the floor of the vehicle body to a point behind the instrument board and provides connections therewith by means of which they can both be actuated by a lever 40 arranged close to the instrument board and within easy grasp of the vehicle operator.

Extending behind the instrument board and secured thereto in a suitable manner, such as by welding, are brackets 41 carrying bearings 42 in which shaft 43 is mounted. On the outside end of this shaft is fixed an arm 44 that is connected by linkage with a shaft 45 extending parallel with the shaft 43 beneath the vehicle body. The shafts 45 and 32 are connected in driving relation by a self-aligning joint consisting of a U-shaped member 47 fixed on the inner end of shaft 45 and a plate member 48 fixed on the outer end of shaft 32, the plate having projecting portions 49 arranged to extend into slots 50 formed in the bent ends of the U-member 47. With this form of joint the transmission casing can have a considerable movement without disturbing the alignment of the driving connection between the shafts 32 and 45. The shaft 45 is supported by a bracket 51 welded or otherwise secured to a side member 52 of the vehicle frame. Within the U-shaped end of this bracket 51 is arranged a complementary U-shaped end of the arm 56, the shaft 45 passing through such U-shaped ends. Bolt 53 lies in the looped end of the arm 56 and engages a recess 54 in the shaft 45 to fix the arm with the shaft. Connected with the forwardly extending ends of the arms 56 and 44 is a link 46 having its ends bent to extend through openings in such arms and secured in operative relation therewith by suitable means such as cotter keys.

As a means for operating the selector a wire 60 is provided that is connected to the arm 25 at its lower end and is encased over its major portion by a flexible housing 61. Suitable bracket means are provided for the flexible casing and one of such bracket means is indicated at 62 and is clamped to the rod 43.

As previously stated, the hand lever 40 is connected so that it can be manipulated to actuate either one of the operating means. Such hand lever is provided with a bent end 63 arranged to extend through an opening 65' in an end of shaft 43 so that it can swivel in such opening in one direction and can be moved in another direction to rotate the shaft. The hand lever is hinged so that it can be moved independently of the shaft 43 in a lateral direction to control the selector mechanism and so that it can be moved in a vertical direction to rotate the shaft. Between the hand lever 40 and the wire 60 is provided connector means 65 in the form of a plate having an opening 64' through which the shaft 43 extends and an opening through which wire 60 projects. A retainer member 66 is fixed on the projecting end of the wire and bears against the plate. Between the plate and the shaft 43 is a coil spring 66' normally tending to hold the plate in a relation such that the spring 26 can move the arm 25 into position where the rail for establishing first and reverse drives is latched. The opening 64' is larger in diameter than the shaft 43, allowing a limited tilting of the plate before it is stopped by engagement with the shaft. The plate 65 is provided with oppositely disposed ears 666 through which the end 63 of the hand lever projects, and one of the ears and the adjacent portion of the hand lever are irregular in form, as indicated at 67, to fix the same so that they will rotate together. Due to this connection, when the hand lever is swung in a lateral direction toward the left, as viewed in Fig. 3, the plate 65 will be tilted to the right at its forward portion carrying therewith the wire 60 which will transmit movement to move the arm 25 in a forward direction and thereby cause the arm 23 to shift the selector member 20 away from the upper rail and into engagement with the recess 19 in the lower rail. As a means of locking the selector mechanism in its position with either rail, a vertically extending gate flange 70 is provided on one of the brackets 41 that overlies a portion of the actuator plate 65 and is provided with a slot 71 through which a tongue 72 on the actuator can pass while the hand lever is in neutral position. When the hand lever is moved to rotate the rod 43 in either direction away from neutral position, then the flange 70 will serve to block the tongue of the actuator member from pivotal movement that will change the position of the selector member 20. The plate is limited in its pivotal movement by the shaft 43 so that the tongue 72 will not pass beyond the upper and lower extremities of flange 70. Thus one of the brackets 41 is utilized for mounting the actuator shaft 43 and as a lock-out means for the connector plate 65 to prevent shifting of the rail that is in latched relation prior to coming to neutral or unlatched relation.

When the hand lever is in the intermediate vertical position, as shown in Fig. 1, the rails are in such position that the gearing will be in neutral and when the hand lever is in such position the springs 66' and 26 will actuate the selector mechanism to hold the selector member 20 in engagement with the upper rail whereby the hand lever 40 can be moved up or down to shift the lower rail forwardly or rearwardly to thereby obtain either high or second speed forward drive through the gearing. When first or reverse drive through the gearing is desired then the hand lever must be shifted laterally to the left to move the actuator 65 to the position shown in dotted lines in Fig. 3, and in so shifting the actuator 65 the hand lever must be in intermediate position, that is neutral position, in order for the tongue 72 to pass through the recess 71 in the gate flange 70. With the actuator 65 in such position the wire 60 has operated the arm 25 to rotate the shaft 24 and rock the arm 25 to move the latch member 20 into the recess 19 in the lower rail 18, whereupon the hand lever can then be moved vertically to the two extreme positions shown in Fig. 1 and thereby shift the lower rail to obtain first or reverse drive through the gearing.

The mechanism herein described for controlling the change speed mechanism is entirely clear of the interior of the vehicle body that may be desired for passenger space with the exception of the short hand lever that projects from under the instrument board. The control mechanism is readily operable due to the manipulation of a single lever and shifts can be readily made. There will be no danger of shifting the change speed mechanism whereby any other than the desired shift will take place at any time. The mechanism forming the subject matter of the invention is relatively simple in construction when it is considered that it must lead from the interior of the body to the casing of the change gear mechanism without being in sight or within the space occupied by the occupants of the body.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a change speed gear mechanism, a pair of parallel rails axially movable to select the gear ratio, a selector element slidably mounted to engage and lock either rail, actuator mechanism connected to the slidably mounted element, a shift member pivotally connected adjacent its ends to said rails, mechanism including interconnected rotatably mounted shaft members operable to swing said shift member about the pivot on a locked rail, a wire operable to actuate said element actuator mechanism, and means operable to selectively actuate said wire or said shift member swinging mechanism.

2. In change speed gear mechanism, a pair of shift rails, means axially movable to selectively lock either of said rails, mechanism including a wire operable to actuate said locking means, a member operable to shift the unlocked rail, means including a rod operable to actuate said member, a hand lever, and means connecting said hand lever to said lock actuating mechanism and to said member operating means, said hand lever being operable by movement in one direction to move the wire axially and by movement in another direction to rotate the rod.

3. In a motor vehicle, a pair of change speed gearing shift rails, mechanism for selectively latching either one of said rails, axially movable means for actuating said selective rail latching mechanism, rail shifting mechanism, a rotatably mounted rod operable to actuate said rail shifting mechanism, a hand lever pivoted to and operable to rotate said rod, a fixed gate member, and means connecting the axially movable means with the hand lever, said connecting means having a tongue portion cooperating with said gate to lock said rail latching mechanism while the rod is being actuated to shift the unlatched rail.

4. In a motor vehicle driving gear control having a selector mechanism and shift mechanism including a shaft, the combination of a fixed bearing bracket for the shaft having a slotted gate flange, an actuator lever pivoted to the shaft, and a plate connection fixed to the lever for actuating the selector mechanism, said plate connection having a portion adapted to pass through the slot in the gate flange and to engage the gate flange when moved to either side of said slot to lock the selector mechanism.

5. In a motor vehicle driving gear control having a selector mechanism and shift mechanism including a shaft, the combination of a hand operated lever pivotally mounted on the shaft to actuate the selector mechanism and rotatable to actuate the shift mechanism, a connector plate movable with the lever and connected in operative relation with the selector mechanism, and spring means engaging said plate to normally urge it and the lever connected thereto toward one extreme position of their pivotal movement.

6. In a motor vehicle driving gear control, a selector mechanism including a wire, a shift mechanism including a shaft, a hand lever pivoted on the shaft of the shift mechanism, and a plate fixed to the hand lever and operatively engaging said wire, said plate having an opening through which the shaft extends of a sufficient size to permit the plate to pivot with the hand lever.

7. In a motor vehicle driving change speed gearing having a pair of shiftable rails, control mechanism for the rails comprising a latch engageable with either rail, mechanism including a wire for actuating said latch to selectively engage either rail, mechanism for shifting the rails including a rotatable shaft, means fixed to said shaft for supporting said wire, and means manually operable to actuate said wire or said shaft.

8. In a motor vehicle driving change speed gearing having a pair of shiftable elements, control mechanism for the elements comprising mechanism operable to selectively latch either element in stationary position, a pair of rotatable parallel shafts connected by linkage for shifting the unlatched element, a manually operable lever pivoted to one of the shafts to rotate the same, and a connector between the latch mechanism and the lever, pivotal movement of the lever actuating the connector to operate said latch mechanism.

9. A control mechanism for a pair of shiftable elements in a motor vehicle change speed drive gearing comprising a pair of rotatably mounted shafts arranged one above the other, arms fixed to the shafts, a link connecting the arms, means actuated by the lower shaft for shifting either of said elements upon rotation of said upper shaft, a lever operable to rotate the upper shaft, latch means for selectively engaging either of said shiftable elements, a wire adjacent the shafts and their connections for controlling said latch means, and means connecting said wire with the lever in a relation to be actuated thereby.

10. In a change speed gear mechanism, a pair of parallel rails axially movable to establish a plurality of driving speed ratios, a lock element mounted for shiftable selective engagement with either rail, actuator mechanism connected to said lock element, a shift member pivotally connected adjacent its ends to said rails, mechanism connected to said shift member and operable to swing the same on the pivot to a locked rail to shift the other rail, a wire connected to the actuator mechanism, and hand operated means connected to said wire and said shift member operating mechanism and operative to selectively actuate either.

11. In a motor vehicle driving gear control, a pair of speed ratio control rails, selector mechanism operable to lock either one of the rails, mechanism operable to actuate either rail when unlocked, a common actuator for said mechanisms movable in one direction to actuate one of the mechanisms and movable in another direction to actuate the other mechanism, and means cooperating with said selector mechanism to maintain it in rail locking relation during operation of the rail actuating mechanism except in neutral position.

12. In a motor vehicle driving gear control, a pair of speed ratio control rails, selector mechanism operable to lock either of said rails, a wire operable to actuate said selector mechanism, mechanism for shifting an unlocked rail, a pivoted hand lever operable to actuate said shifting mechanism when rotated, a connector plate carried by and movable with said hand lever, said wire extending through said plate, and a retainer fixed to the end of said wire projecting through the plate and bearing against the plate, rocking movement of said hand lever on its pivot controlling said wire and the selector mechanism.

FRANK C. BEST.